(12) United States Patent
Sussland et al.

(10) Patent No.: US 8,116,455 B1
(45) Date of Patent: Feb. 14, 2012

(54) SYSTEM AND METHOD FOR SECURELY INITIALIZING AND BOOTING A SECURITY APPLIANCE

(75) Inventors: Robert Jan Sussland, San Francisco, CA (US); Ananthan Subramanian, Menlo Park, CA (US); Lawrence Wen-Hao Chang, San Francisco, CA (US)

(73) Assignee: NetApp, Inc., Sunnyvale, CA (US)

( * ) Notice: Subject to any disclaimer, the term of this patent is extended or adjusted under 35 U.S.C. 154(b) by 848 days.

(21) Appl. No.: 11/540,300

(22) Filed: Sep. 29, 2006

(51) Int. Cl.
*H04L 9/00* (2006.01)
*H04L 9/08* (2006.01)
*H04L 9/14* (2006.01)
*H04L 29/06* (2006.01)

(52) U.S. Cl. ............ 380/277; 380/45; 380/44; 380/278; 380/282; 713/171; 713/168; 726/2; 726/16; 726/17; 726/20; 726/34

(58) Field of Classification Search .................. None
See application file for complete search history.

(56) References Cited

U.S. PATENT DOCUMENTS

| | | | |
|---|---|---|---|
| 4,570,217 A | 2/1986 | Allen et al. | |
| 5,124,987 A | 6/1992 | Milligan et al. | |
| 5,163,131 A | 11/1992 | Row et al. | |
| 5,202,979 A | 4/1993 | Hillis et al. | |
| 5,278,979 A | 1/1994 | Foster et al. | |
| 5,403,667 A | 4/1995 | Simoens | |
| 5,581,724 A | 12/1996 | Belsan et al. | |
| 5,937,066 A | 8/1999 | Gennaro et al. | |
| 6,061,770 A | 5/2000 | Franklin | |
| 6,081,875 A | 6/2000 | Clifton et al. | |
| 6,341,341 B1 | 1/2002 | Grummon et al. | |
| 6,981,152 B2 * | 12/2005 | Du et al. ....................... | 713/193 |
| 7,010,689 B1 * | 3/2006 | Matyas et al. ................ | 713/168 |
| 7,055,029 B2 * | 5/2006 | Collins et al. ................. | 713/161 |
| 7,069,439 B1 * | 6/2006 | Chen et al. .................... | 713/172 |
| 7,127,577 B2 | 10/2006 | Koning et al. | |
| 7,360,073 B1 * | 4/2008 | Billstrom et al. .............. | 713/2 |
| 7,370,211 B2 * | 5/2008 | Rindborg et al. ............. | 713/191 |
| 7,380,275 B2 * | 5/2008 | Srinivasan et al. ............ | 726/17 |
| 7,434,263 B2 * | 10/2008 | Lampson et al. ............. | 726/27 |
| 7,865,741 B1 | 1/2011 | Wood | |
| 7,874,004 B2 | 1/2011 | Han et al. | |

(Continued)

OTHER PUBLICATIONS

Akyurek, Sedat, *Placing Replicated Data to Reduce Seek Delays*, Department of Computer Science, University of Maryland, UMIACS-TR-91-121, CS-TR-2746, Aug. 1991.

(Continued)

*Primary Examiner* — Syed A. Zia
(74) *Attorney, Agent, or Firm* — Cesari and McKenna, LLP (57) ABSTRACT

A system and method provides for secure initialization and booting of a security appliance. The security appliance cooperates with a "smart" system card to provide cryptographic information needed to boot the security appliance in accordance with a secure boot procedure. The initialization procedure commences once the security appliance detects the presence of the smart card. The smart card and an encryption processor perform an authentication and key exchange procedure to establish a secure communication channel between them. The system card then loads a twice wrapped master key from a configuration database and decrypts the master key using a key associated with the system card. The wrapped master key is then forwarded via the secure communication channel to the encryption processor, which decrypts the wrapped key using a key associated therewith and enters an operating state using the decrypted master key.

22 Claims, 6 Drawing Sheets

U.S. PATENT DOCUMENTS

| | | | |
|---|---|---|---|
| 7,886,158 B2 | 2/2011 | Osaki | |
| 7,983,423 B1* | 7/2011 | Agarwal et al. | 380/278 |
| 2001/0045451 A1* | 11/2001 | Tan et al. | 235/375 |
| 2003/0018892 A1* | 1/2003 | Tello | 713/164 |
| 2003/0074548 A1* | 4/2003 | Cromer et al. | 713/1 |
| 2004/0073792 A1* | 4/2004 | Noble et al. | 713/168 |
| 2004/0088558 A1* | 5/2004 | Candelore | 713/193 |
| 2005/0060549 A1* | 3/2005 | England et al. | 713/175 |
| 2006/0018484 A1* | 1/2006 | Yoshihiro et al. | 380/277 |
| 2007/0094507 A1* | 4/2007 | Rush | 713/176 |
| 2007/0300080 A1* | 12/2007 | Brown et al. | 713/193 |
| 2010/0189263 A1* | 7/2010 | Cunningham et al. | 380/279 |

OTHER PUBLICATIONS

Bitton, Dina, *Disk Shadowing*, Proceedings of the 14th VLDB Conference, LA, CA 1988.

Chaudhuri, Surajit, et al., *Self-Tuning Technology in Microsoft SQL Server*, Data Engineering Journal 22, 2 1999 pp. 20-27.

Chutani, Sailesh, et al., *The Episode File System*, In Proceedings of the USENIX Winter 1992.

Coyne, Robert A., et al., *Storage Systems for National Information Assets*, Proc. Supercomputing 92, Minneapolis, Nov. 1992, pp. 626-633.

Finlayson, Ross S., et al., *Log Files: An Extended File Service Exploiting Write-Once Storage*Department of Computer Science, Stanford University, Report No. STAN-CS-87/1177, Sep. 1987.

Gray, Jim, et al., *The Recovery Manager of the System R Database Manager*, ACM Computing Surveys, (13)2:223-242 1981.

Hecht, Matthew S., et al. *Shadowed Management of Free Disk Pages with a Linked List*, ACM Transactions on Database Systems, 8/4, Dec. 1983, pp. 503-514.

Howard, John, H. et al., *Scale and Performance in a Distributed File System*, Carnegie Mellon University, CMU-ITC-87-068, Aug. 1987.

Howard, John H., *An Overview of the Andrew File System*, Carnegie Mellon University, CMU-ITC-88-062 1988.

Howard, John, H. et al., *Scale and Performance in a Distributed File System*, ACM Trans. Computer System, 6(1), Feb. 1988 pp. 51-81.

Kazar, Michael Leon, *Synchronization and Caching Issues in the Andrew File System*, Carnegie Mellon University, CMU-ITC-88-063.

Kazar, Michael L., et al., *DEcorum File System Architectural Overview*, USENIX Summer Conference, Anaheim, California, 1990.

Kemper, Alfons, et al., *Performance Tuning for SAP R/3*, Data Engineering Journal 22, 2 1999 pp. 33-40.

Kent, Jack et al., *Optimizing Shadow Recovery Algorithms*, IEEE Transactions on Software Engineering, 14( 2): 155-168 , Feb. 1988.

Kistler, et al., *Disconnected Operation in the Coda File System*, ACM Transactions on Computer Systems, vol. 10, No. 1, Feb. 1992, pp. 3-25.

Lorie, Raymond, A. *Physical Integrity in a Large Segmented Database*, ACM Trans. Database Syst., vol. 2, Mar. 1977, pp. 91-104.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley 1987.

Patterson, D., et al., *A Case for Redundant Arrays of Inexpensive Disks (RAID)*, SIGMOD International Conference on Management of Data, Chicago, IL, USA, Jun. 1-3, 1988, SIGMOD RECORD (17)3:109-16 Sep. 1988.

Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.

Quinlan, Sean, *A Cached WORM File System*, Software-Practice and Experience, 21(12):1289-1299 1991.

Rosenblum, Mendel, et al., *The LFS Storage Manager*, Computer Science Division, Electrical Engineering And Computer Sciences, Univ. of CA, presented at Summer '90 USENIX Technical Conference, Anaheim, CA Jun. 1990.

Rosenblum, Mendel, et al. *The Design and Implementation of a Log-Structured File System* Jul. 24, 1991 pp. 1-15.

Rosenblum, Mendel, *The Design and Implementation of a Log-Structured File System*, 1992 pp. 1-93.

Rosenblum, Mendel, et al., *The Design and Implementation of a Log-Structured File System*, In Proceedings of ACM Transactions on Computer Systems, (10)1:26-52, Feb. 1992.

Schiefer, Berni, et al., *DB2 Universal Database Performance Tuning*, Data Engineering Journal 22, 2 1999 pp. 12-19.

Seltzer, Margo I., et al., *Journaling Versus Soft Updates: Asynchronous Meta-Data Protection in File Systems*, Proceedings of 200 USENIX Annual Technical Conference, Jun. 18-23, 2000.

Shasha, Dennis, *Tuning Time Series Queries in Finance: Case Studies and Recommendations*, Data Engineering Journal 22, 2 1999 pp. 41-47.

Sidebotham, Bob, Volumes: *The Andrew File System Data Structuring Primitive*, EEUG Conference Proceedings, Manchester, UK, Autumn 1986.

Subramanian, Muralidhar, et al., *Performance Challenges in Object-Relational DBMSs*, Data Engineering Journal 22, 2 1999 pp. 28-32.

Weikum, Gerhard, et al., Towards Self-Tuning Memory Management for Data Servers, Data Engineering Journal 22, 2 1999 pp. 3-11.

West, Michael, et al. *The ITC Distributed File System: Prototype and Experience*, Carnegie-Mellon University, Technical Report CMU-ITC-040, Mar. 1985.

Zayas, Edward R., AFS-3 Programmer's Reference: Architectural Overview, Transarc Corporation, Pittsburgh, PA, 1.0 edition 1991.

U.S. Appl. No. 11/540,331 entitled System and method for generating a single use password based on a challenge/response protocol, filed Sep. 29, 2006 by Lawrence Wen-Hao Chang, 26 pages.

U.S. Appl. No. 11/540,440 entitled System and method for initial key establishment using a split knowledge protocol, filed Sep. 29, 2006 by Ananthan Subramanian , 27 pages.

* cited by examiner

SYSTEM AND METHOD FOR SECURELY INITIALIZING AND BOOTING A SECURITY APPLIANCE

FIELD OF THE INVENTION

The present invention relates to computers, and more specifically, to securely booting a computer, such as a security appliance.

BACKGROUND OF THE INVENTION

A storage system is a computer that provides storage service relating to the organization of information on writable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of data containers, such as files on, e.g., the disks. Each "on-disk" file may be implemented as a set of data structures, e.g., disk blocks, configured to store information, such as the actual data (i.e., file data) for the file.

The file server, or filer, may be further configured to operate according to a client/server model of information delivery to thereby allow many client systems (clients) to access shared resources, such as files, stored on the filer. Sharing of files is a hallmark of a NAS system, which is enabled because of its semantic level of access to files and file systems. Storage of information on a NAS system is typically deployed over a computer network comprising a geographically distributed collection of interconnected communication links, such as Ethernet, that allow clients to remotely access the information (files) on the filer. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS) and the Network File System (NFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored data using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC (e.g., FCP) or TCP (iSCSI).

SCSI is a peripheral input/output (I/O) interface with a standard, device independent protocol that allows different peripheral devices, such as disks, to attach to a storage system. In SCSI terminology, clients operating in a SAN environment are "initiators" that initiate commands and requests to access data. The storage system is thus a "target" configured to respond to the data access requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

A SAN arrangement or deployment allows decoupling of storage from the storage system, such as an application server, and some level of information storage sharing at the storage system level. There are, however, environments wherein a SAN is dedicated to a single storage system. In some SAN deployments, the information is organized in the form of databases, while in others a file-based organization is employed. Where the information is organized as files, the client requesting the information maintains file mappings and manages file semantics, while its requests (and storage system responses) address the information in terms of block addressing on disk using, e.g., a logical unit number (lun).

A network environment may be provided wherein information (data) is stored in secure storage served by one or more storage systems coupled to one or more security appliances. Each security appliance is illustratively embodied as a computer configured to transform unencrypted data (cleartext) generated by clients (or initiators) into encrypted data (ciphertext) destined for secure storage or "cryptainers" on the storage system (or target). As used herein, a cryptainer is a piece of storage on a storage device, such as a disk, in which the encrypted data is stored. In the context of a SAN environment, a cryptainer can be, e.g., a disk, a region on the disk or several regions on one or more disks that, in the context of a SAN protocol, is accessible as a lun. In the context of a NAS environment, the cryptainer may be a collection of files on one or more disks. Specifically, in the context of the CIFS protocol, the cryptainer may be a share, while in the context of the NFS protocol, the cryptainer may be a mount point. In a tape environment, the cryptainer may be a tape containing a plurality of tape blocks.

Each cryptainer is associated with its own encryption key, e.g., a cryptainer key, which is used by the security appliance to encrypt and decrypt the data stored on the cryptainer. An encryption key is a code or number which, when taken together with an encryption algorithm, defines a unique transformation used to encrypt or decrypt data. Data remains encrypted while stored in a cryptainer until requested by an authorized client. At that time, the security appliance retrieves the encrypted data from the cryptainer, decrypts it and forwards the unencrypted data to the client.

Possession and control of a security appliance are often factors that lead to the compromise of encrypted data due to security attacks directed to the appliance. For example, if a security appliance is misappropriated and physically removed from an installation, an attacker may recover encryption keys and/or other cryptographic information from the security appliance at its leisure by, for example, reading or retrieving the cryptographic information from storage within the appliance. A further noted disadvantage arises when a security appliance is shipped, e.g., from a central facility to a branch office of a corporation. If cryptographic information is included within the security appliance, interception of the shipment enables an attacker to gain complete control over the security appliance including, e.g., encryption keys. It is thus desirous to require that an attacker obtain more than physical possession and control of a security appliance to compromise cryptographic information associated therewith.

SUMMARY OF THE INVENTION

The disadvantages of the prior art are overcome by providing a system and method for securely initializing and booting a computer, such as a security appliance. Broadly stated, the security appliance cooperates with a "smart" system card to provide cryptographic information needed to initialize the security appliance in accordance with an initialization procedure. To that end, the system card contains an ignition key used to "wrap", i.e., encrypt and sign a remaining portion of the cryptographic information received from the security appliance. By ensuring that the security appliance does not initialize without cooperation of the system card, the initialization procedure obviates compromising of the appliance based solely on physical possession and control of the appliance.

In the illustrative embodiment, the initialization procedure commences once the security appliance detects the presence of the smart card. In response, a storage encryption processor (SEP) generates a master key of a key hierarchy used to organize various key material needed for operation of the storage appliance. The SEP then wraps the master key with an ignition key associated with the SEP. Wrapping, in this context, denotes encryption and signing; each key illustratively includes an encryption component, a signature component and various metadata of a package. In addition, the SEP and the system card establish a secure communication channel and the SEP forwards the wrapped master key over the channel to the system card. Upon receipt, the system card wraps the received master key with its ignition key to produce a doubly-wrapped master key. Double wrapping of the master key ensures that if either the security appliance is misappropriated while in a powered off state, or if the system card is misappropriated, then no key material can be compromised; i.e. a "two man rule" for secure boot. The double wrapped master key is then stored in a configuration database of the security appliance, thereby completing initialization of the security appliance in accordance with the initialization procedure. The system card may thereafter be securely stored in a location remote from the security appliance.

Furthermore, the present invention provides a system and method for securely booting a computer, such as a security appliance. Once a security appliance is first initialized, upon each boot up, a secure booting procedure is performed to ensure that the security appliance only boots in response to the presence of the system card. Once the booting procedure is initiated, the system card and SEP perform a cryptographic authentication and key exchange protocol to establish a secure channel between them. Should the system card not be inserted, the booting procedure is halted until such time as the card is inserted, thereby requiring both the system card and the physical security appliance to boot.

Once the secure channel has been established between the SEP and the system card, the system card loads the twice wrapped master key from the configuration database and decrypts the outer wrapping using the ignition key associated with the system card. Once the master key has been decrypted, the unwrapped master key is forward, via the secure communication channel, to the SEP. The SEP decrypts the master key using its ignition key and stores the unencrypted master key within the SEP for use. Should the security appliance be powered off, the master key is cleared from the SEP, thereby requiring the secure booting procedure to be performed again. As the master key is only accessible to one with both the system card and the physical security appliance, overall security is increased as an attacker must acquire two separate items to be able to compromise encrypted data.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
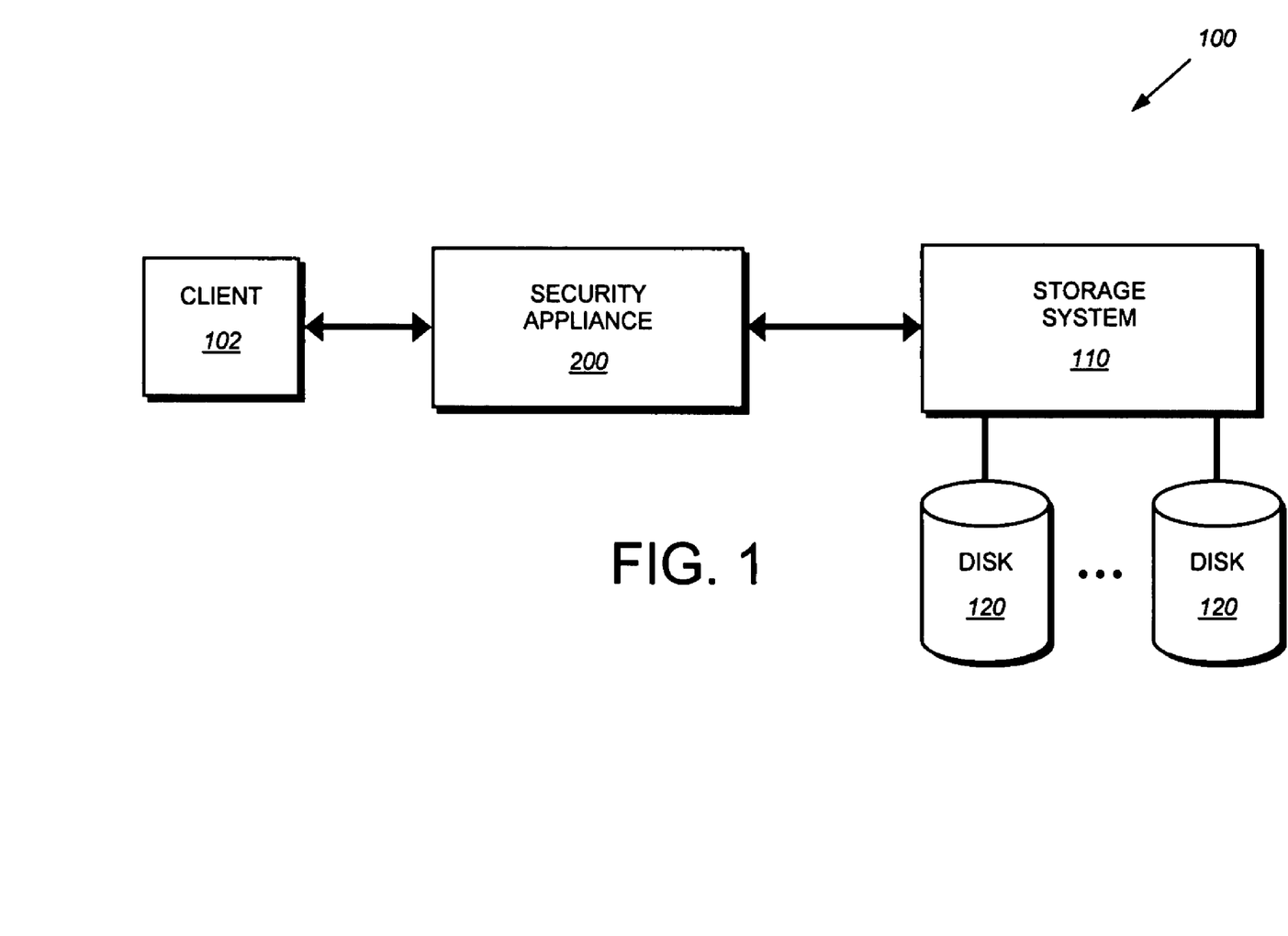
FIG. 1 is a schematic block diagram of an environment including a multi-protocol security appliance in accordance with an illustrative embodiment of the present invention.

FIG. 1 is a schematic block diagram of an environment 100 including a multi-protocol security appliance 200 in accordance with an illustrative embodiment of the present invention. The security appliance 200 is coupled between one or more clients 102 and one or more storage systems 110, such as an application server or filer. The security appliance 200, which is configured to act as an encryption proxy, intercepts a data access request issued by client 102 and destined for the storage system 110, wherein the data access request may be a read request to retrieve certain data stored on storage devices, such as disks 120, coupled to the storage system 110 or a write request to store data on the disks. In the case of a write request, the security appliance 200 intercepts the request, encrypts the data associated with the request and forwards the encrypted data to the storage system 110 for storage at a specified location (address) on disk 120. In the case of a read request, the security appliance intercepts the request and forwards it onto the storage system, which returns the requested data to the appliance in encrypted form. The security appliance 200 then decrypts the encrypted data and returns the decrypted data to the client 102.

In the illustrative embodiment, the security appliance employs a conventional encryption algorithm, e.g., the Advanced Encryption Standard (AES) or other appropriate algorithms, to transform unencrypted data (cleartext) generated by the clients 102 into encrypted data (ciphertext) intended for secure storage, i.e., one or more cryptainers, on the storage system 110. To that end, the security appliance illustratively uses a high-quality, software or hardware-based pseudo random number generation technique to generate encryption keys. The encryption and decryption operations are performed using these encryptions keys, such as a cryptainer key associated with each cryptainer. As described herein, the security appliance 200 uses an appropriate cryptainer key to encrypt or decrypt portions of data stored in a particular cryptainer. In addition to performing encryption and decryption operations, the security appliance 200 also performs access control, authentication, virtualization, and secure-logging operations.

Figure 2:
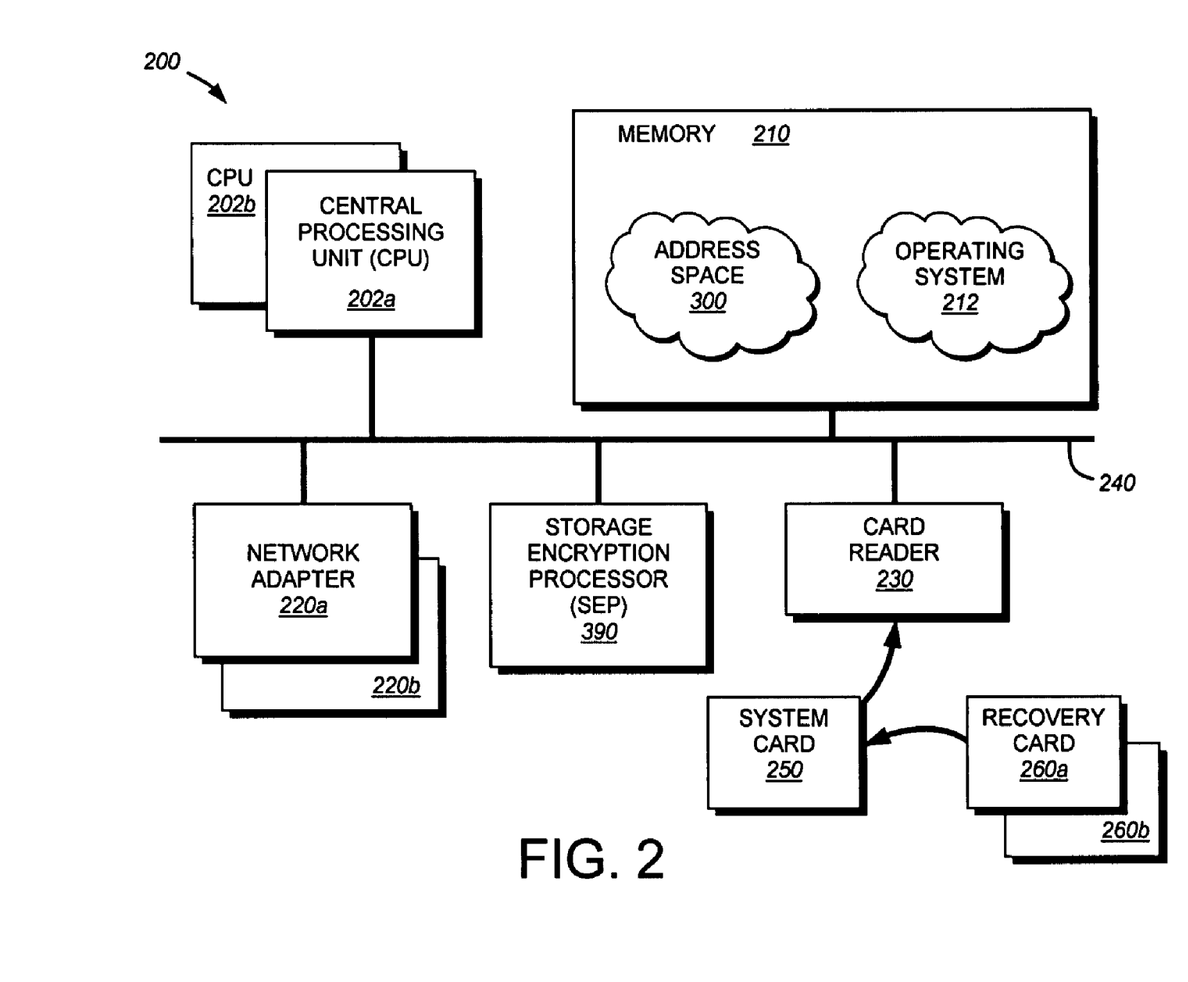
FIG. 2 is a schematic block diagram of the multi-protocol security appliance in accordance with an illustrative embodiment of the present invention.

FIG. 2 is a schematic block diagram of the multi-protocol security appliance 200 that may be advantageously used with the present invention. As used herein, a security appliance denotes a computer having features such as simplicity of security service management for users (system administrators) and clients of network attached storage (NAS) and storage area network (SAN) deployments. The security appliance comprises one or more processors, e.g., central processing units (CPU 220a,b), a memory 210, one or more network adapters 220a,b, a storage encryption processor (SEP 390) and a card reader 230 interconnected by a system bus 240, such as a conventional Peripheral Component Interconnect (PCI) bus. The SEP 390 is configured to perform all encryption and decryption operations for the security appliance in a secure manner; for example, the SEP is configured to protect plaintext encryption keys from system software executing on each CPU 202. Accordingly, the SEP is illustratively embodied as a FIPS 140-2 certified module that is connected to a dedicated interface card or other similar card.

Since the SEP 390 protects encryption keys from being "touched" (processed) by the system software executing on the CPU 202, a mechanism is needed to load keys into and retrieve keys from the SEP. To that end, the card reader 230 provides an interface between a "smart" system card 250 and the SEP 390 for purposes of exchanging encryption keys. Illustratively, the system card is a FIPS 140-2 certified card that is configured with customized software code. As described further below, a portion of the cryptographic information needed to initialize the security appliance is stored on the system card 250, thereby preventing the initialization of the appliance 200 without the presence of the card 250. The security appliance (and card reader 230) are further configured to support additional smart cards referred to as recovery cards 260a,b.

Operationally, encryption keys are exchanged between the SEP 390 and system card 250, where they are "secret shared" (cryptographically assigned) to the recovery cards 260 as recovery keys. These recovery keys can thereafter be applied (via the recovery cards) to the security appliance 200 to enable restoration of other encryption keys is (such as cryptainer keys). A quorum setting for the recovery cards 260 may be provided such that the recovery keys stored on the recovery cards are backed up in a threshold scheme whereby, e.g., any 2 of the 5 default cards can recover the keys.

The network adapters 220 couple the security appliance 200 between one or more clients 102 and one or more storage systems 110 over point-to-point links, wide area networks, virtual private networks implemented over a public network (Internet) or shared local area networks. In a SAN environment configured to support various Small Computer Systems Interface (SCSI)-based data access protocols, including SCSI encapsulated over TCP (iSCSI) and SCSI encapsulated over FC (FCP), the network adapters 220 may comprise host bus adapters (HBAs) having the mechanical, electrical and signaling circuitry needed to connect the appliance 200 to, e.g., a FC network. In a NAS environment configured to support, e.g., the conventional Common Internet File System (CIFS) and the Network File System (NFS) data access protocols, the network adapters 220 may comprise network interface cards (NICs) having the mechanical, electrical and signaling circuitry needed to connect the appliance to, e.g., an Ethernet network.

The memory 210 illustratively comprises storage locations that are addressable by the processors and adapters for storing software programs and data structures associated with the present invention. The processor and adapters may, in turn, comprise processing elements and/or logic circuitry configured to execute the software programs and manipulate the data structures. An operating system 212, portions of which is typically resident in memory and executed by the processing elements, functionally organizes the appliance 200 by, inter alia, invoking security operations in support of software processes and/or modules implemented by the appliance. It will be apparent to those skilled in the art that other processing and memory means, including various computer readable media, may be used for storing and executing program instructions pertaining to the invention described herein.

Figure 3:
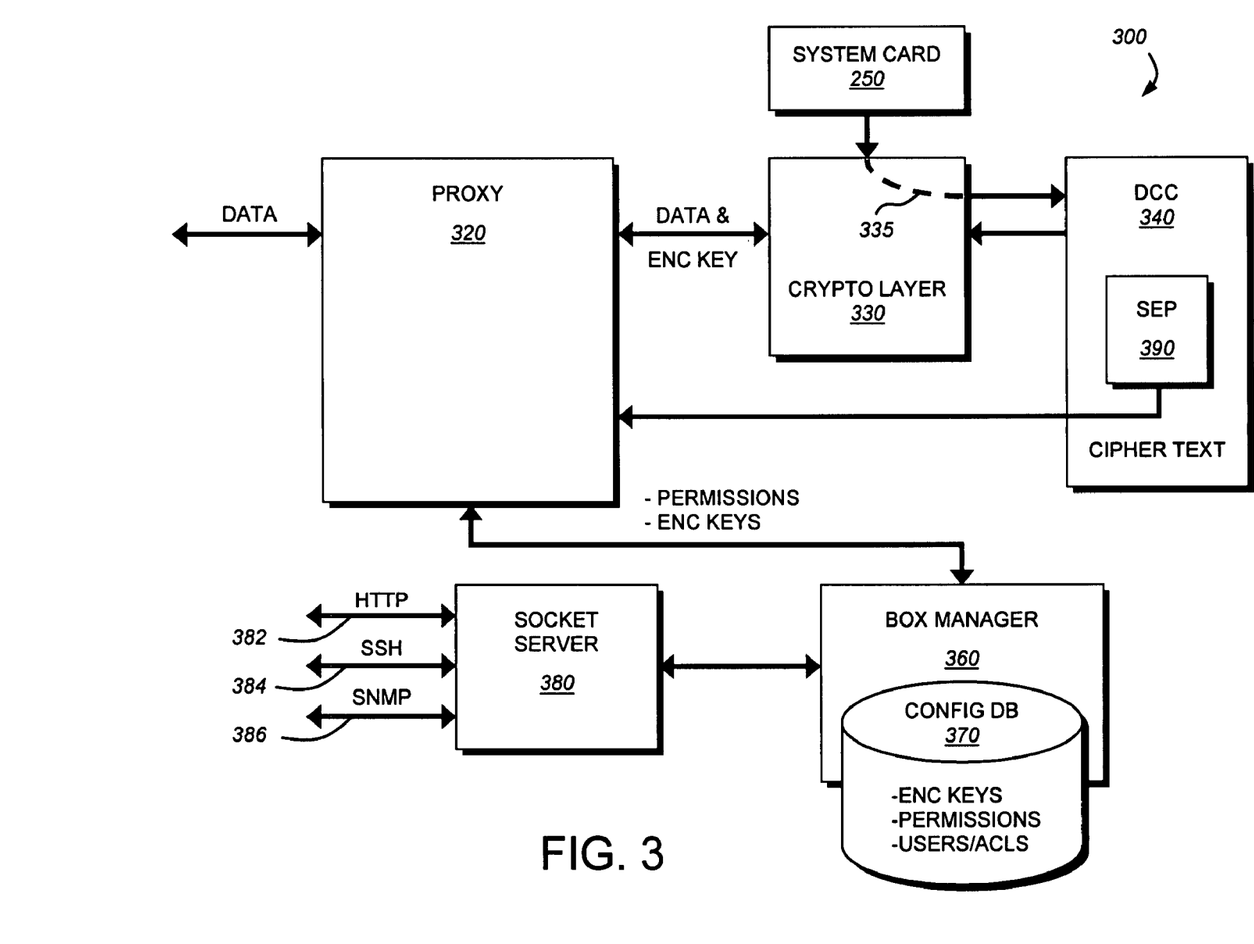
FIG. 3 is a schematic diagram illustrating an arrangement of software processes and modules executing on the security appliance in accordance with an illustrative embodiment of the present invention.

The operating system 212 illustratively organizes the memory 210 into an address space arrangement available to the software processes and modules executing on the processors. FIG. 3 is a schematic diagram illustrating an arrangement 300 of software is processes and modules executing on the security appliance 200 in accordance with the present invention. In the illustrative embodiment, the operating system software is a customized version of a Unix type operating system, although other operating systems, such as a Microsoft Windows operating system may be used.

For both NAS and SAN environments, data is received at a proxy 320 of the security appliance. The proxy 320 is a kernel module embodied as, e.g., the network protocol stack configured to interpret the protocol over which data is received and to enforce certain access control rules based on one or more policies. Each policy is served by a box manager 360 that executes in user space. The box manager 360 is illustratively embodied as a database application process configured to manage a configuration repository or database (Config DB 370) that stores permissions, access control lists (ACLS), system-wide settings and encrypted keys. A socket server 380 provides interfaces to the box manager 360, including (i) an HTTP web interface 382 embodied as, e.g., a graphical user interface (GUI) adapted for web-based administration, (ii) a SSH interface 384 for command line interface (CLI) command administration, and (iii) an SNMP interface 386 for remote management and monitoring.

Specifically, the box manager 360 supplies the permissions and encrypted keys to the proxy 320, which intercepts data access requests and identifies the sources (clients 102) of those requests, as well as the types of requests and the storage targets (cryptainers) of those requests. The proxy also queries the box manager for permissions associated with each client and, in response, the box manager 360 supplies the appropriate permissions and encrypted key (e.g., a cryptainer key). The proxy 320 then bundles the data together with the encrypted key and forwards that information to a crypto process (layer) 330 that functions as a "wrapper" for the SEP 390. The SEP illustratively resides on an interface card, which is hereinafter referred to a data crypto card (DCC 340).

The crypto layer 330 interacts with the DCC 340 by accessing (reading and writing) registers on the DCC and, to that end, functions as a PCI interface. Illustratively, a descriptor queue is used by the crypto layer to access the DCC by, e.g., supplying starting and ending points of data, as well as offsets into the data and the encrypted keys used to encrypt the data. The DCC 340 includes one or more previously loaded keys used to decrypt the supplied encrypted keys; upon decrypting an encrypted key, the DCC uses the decrypted key to encrypt the supplied data. Upon completion of encryption of the data, the DCC returns the encrypted data as ciphertext to the proxy 320, which forwards the encrypted data to the storage system 110.

Notably, the security appliance 200 "virtualizes" storage such that, to a client 102, the appliance appears as a storage system 110 whereas, from the perspective of the storage system, the security appliance appears as a client. Such virtualization requires that security appliance manipulate (IP) addresses with respect to data access requests and responses. Illustratively, certain customizations to the network protocol stack of the proxy 320 involve virtualization optimizations provided by the appliance. For example, the security appliance 200 manipulates (changes) the source and destination IP addresses of the data access requests and responses.

In the illustrative embodiment, the encrypted key, e.g., a cryptainer key, exchanged between the proxy 320, box manager 360 and crypto layer 330 is encrypted by a domain key. In addition, the previously loaded key used by the DCC 340 (or, more specifically, the SEP 390) to decrypt the encrypted cryptainer key is a domain key previously supplied to the SEP via the system card 250. The system card illustratively supplies the key over a secure (encrypted) communication channel 335 through the crypto layer 330 to the DCC 340 that is established at boot time. The system card may further initiate loading of additional key material (such as domain keys) from the configuration database 370 into the SEP over that secure channel. This procedure provides the SEP with all domain keys needed to encrypt or decrypt keys supplied to it by the proxy 320.

The present invention provides a system and method for securely initializing and booting a computer, such as a security appliance. Broadly stated, the security appliance cooperates with a "smart" system card to provide cryptographic information needed to initialize the security appliance in accordance with an initialization procedure. To that end, the system card contains an ignition key used to "wrap", i.e., encrypt and sign a remaining portion of the cryptographic information received from the security appliance. By ensuring that the security appliance does not initialize without cooperation of the system card, the initialization procedure obviates compromising of the appliance based solely on physical possession and control of the appliance.

In the illustrative embodiment, the initialization procedure commences once the security appliance detects the presence of the smart card or other appropriate hardware based token. In response, a storage encryption processor (SEP) generates a master key of a key hierarchy used to organize various key material needed for operation of the storage appliance. The SEP then wraps the master key with an ignition key associated with the SEP. In addition, the SEP and the system card establish a secure communication channel and the SEP forwards the wrapped master key over the channel to the system card. Upon receipt, the system card wraps the received master key with its ignition key to product a doubly-wrapped master key. Double wrapping of the master key ensures that if the security appliance is misappropriated while in a powered off state, no key material can be obtained from the appliance without the system card. Moreover, double wrapping ensures that if a system card is misappropriated, no key material may be extracted from the system card that would allow compromise of key material in the absence of the security appliance. The double wrapped master key is then stored in a configuration database of the security appliance, thereby completing initialization of the security appliance in accordance with the initialization procedure. The system card may thereafter be securely stored in a location remote from the security appliance.

Furthermore, the present invention provides a system and method for securely booting a computer, such as a security appliance. Once a security appliance is first initialized, upon each boot up, a secure booting procedure is performed to ensure that the security appliance only boots in response to the presence of the system card. Once the booting procedure is initiated, the system card and SEP perform a cryptographic authentication and key exchange procedure to establish a secure channel between them. Should the system card not be inserted, the booting procedure is halted until such time as the card is inserted, thereby requiring both the system card and the physical security appliance to boot.

Once the secure channel has been established between the SEP and the system card, the system card loads the twice wrapped master key from the configuration database and decrypts the outer wrapping using the ignition key associated with the system card. Once the master key has been decrypted, the unwrapped master key is forward, via the secure communication channel, to the SEP. The SEP decrypts the master key using its ignition key and stores the unencrypted master key within the SEP for use. Should the security appliance be powered off, the master key is cleared from the SEP, thereby requiring the secure booting procedure to be performed again. As the master key is only accessible to one with both the system card and the physical security appliance, overall security is increased as an attacker must acquire two separate items to be able to compromise encrypted data.

Figure 4:
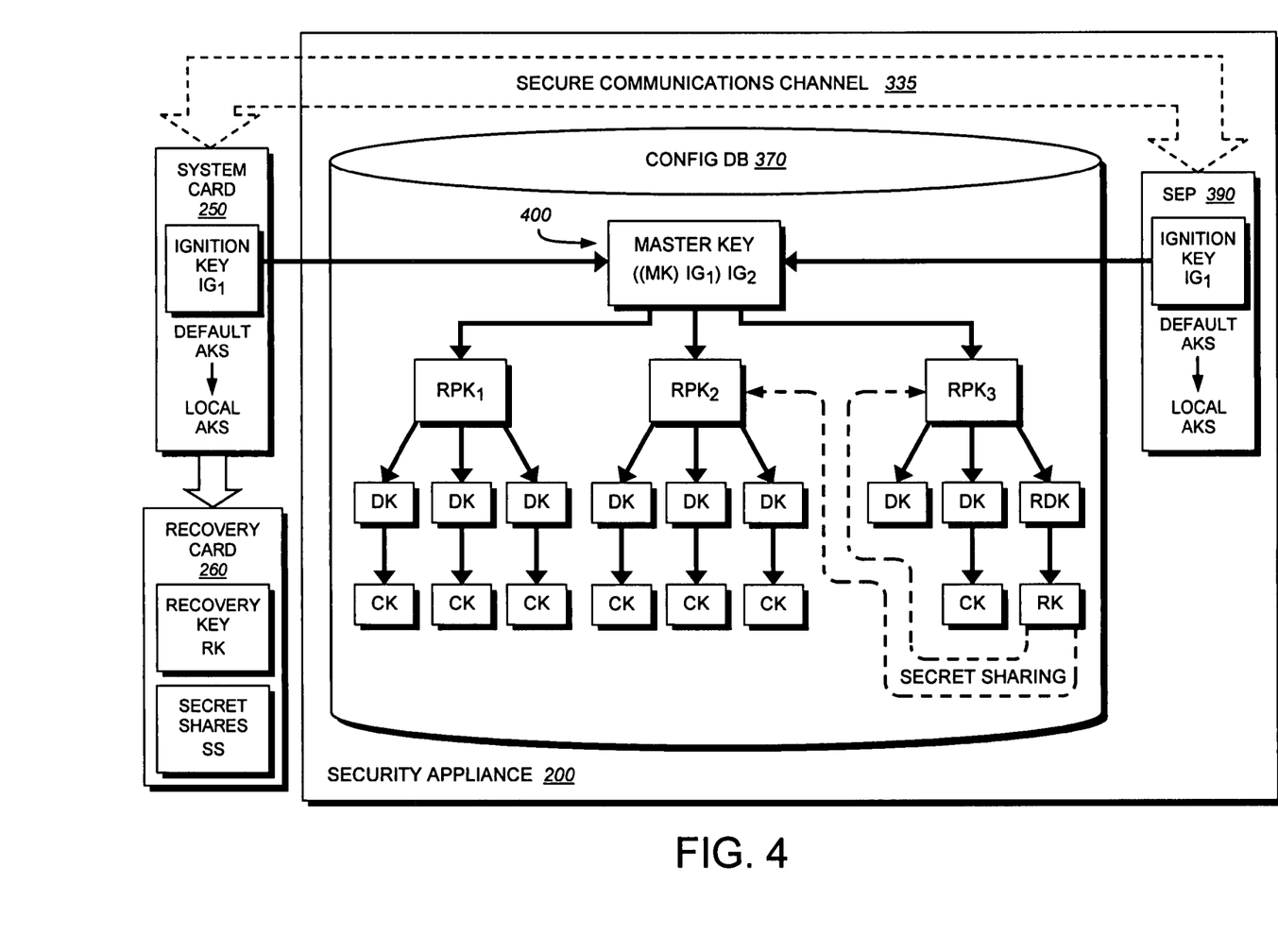
FIG. 4 is a schematic block diagram illustrating a key hierarchy in accordance with an embodiment of the present invention.

FIG. 4 is a schematic block diagram of an exemplary key hierarchy 400 in accordance with an illustrative embodiment of the present invention. The keys used by security appliance 200 are illustratively created during a system initialization (boot) process. At that time, the key hierarchy 400 is also created, generally in response to user interaction with the security appliance via, e.g., an initialization wizard of the GUI. The SEP 390 is provided with a default authentication key set (AKS) that is used to establish the secure communication channel 335 with the system card 250. Default AKS material is established via an operation whereby an identifier (ID) of the system card is illustratively hashed with the default AKS to establish a derived AKS that is used by the system card. This operation is utilized as the default AKS illustratively is only preconfigured (shipped) with the SEP and not with every system card used with the security appliance 200. The system card 250 and SEP 390 then cooperate to establish a local AKS, i.e., local to each (SEP, system card) pair, at which point the system card and SEP can communicate securely over the channel 335.

In addition, the SEP 390 creates a master key MK and wraps that key with a first ignition key $IG_1$ that is preconfigured on the SEP. Wrapping, in this context, denotes encryption and signing; each key illustratively includes an encryption component, a signature component and various metadata of a package. Thus, to "wrap" a second key with a first key means that the encryption component of the first key is used to encrypt both encryption and signature components of the second key, and the signature component of the is first key is used to sign the entire second key (encryption and signature components, as well as the metadata). To "unwrap" a key, a reverse of the above operation is followed.

The SEP 390 then forwards the wrapped master key $(MK)_{IG_1}$ over the secure communication channel to the system card 250, which wraps that wrapped key with a second ignition key $IG_2$ that is preconfigured on the card 250. Therefore, the master key MK is wrapped twice with the first ignition key $IG_1$ (from the SEP 390) and the second ignition key $IG_2$ (from the system card). The twice (double) wrapped master key $((MK)_{IG_1})_{IG_2}$ is then stored on the configuration database 370 of the security appliance 200. Double wrapping of the master key MK ensures that the CPU 202 of the security appliance is prevented from ever processing ("touching") the key MK.

Such encryption further ensures that if a powered off security appliance is misappropriated, no key material is compromised (i.e., can be obtained) unless the system card 250 is also misappropriated. As the presence of the system card is only required for initialization, an administrator may remove the system card from the security appliance and securely store it in a location remote from the security appliance. Thus, both the physical security appliance and the system card are needed to compromise the security appliance.

Illustratively, the master key MK, the ignition key $IG_1$ on the SEP and the default AKS (and local AKS) are the only keys stored in permanent non-volatile memory on the SEP. All other keys in the key hierarchy are accessed at run time in volatile memory and are "zeroed" whenever the software modules of the security appliance are powered down. Specifically, these other keys include recovery policy keys that are generated by the SEP using the master key MK. Notably, there may be a plurality of recovery policy keys (e.g., $RPK_1$, $RPK_2$, $RPK_3$) in the key hierarchy 390. Additional keys in the key hierarchy that are wrapped by these recovery policy keys include domain keys (DK) that, in turn, wrap cryptainer keys (CK). The cryptainer keys CK are used to encrypt (and sometimes sign) secure storage.

Figure 5:
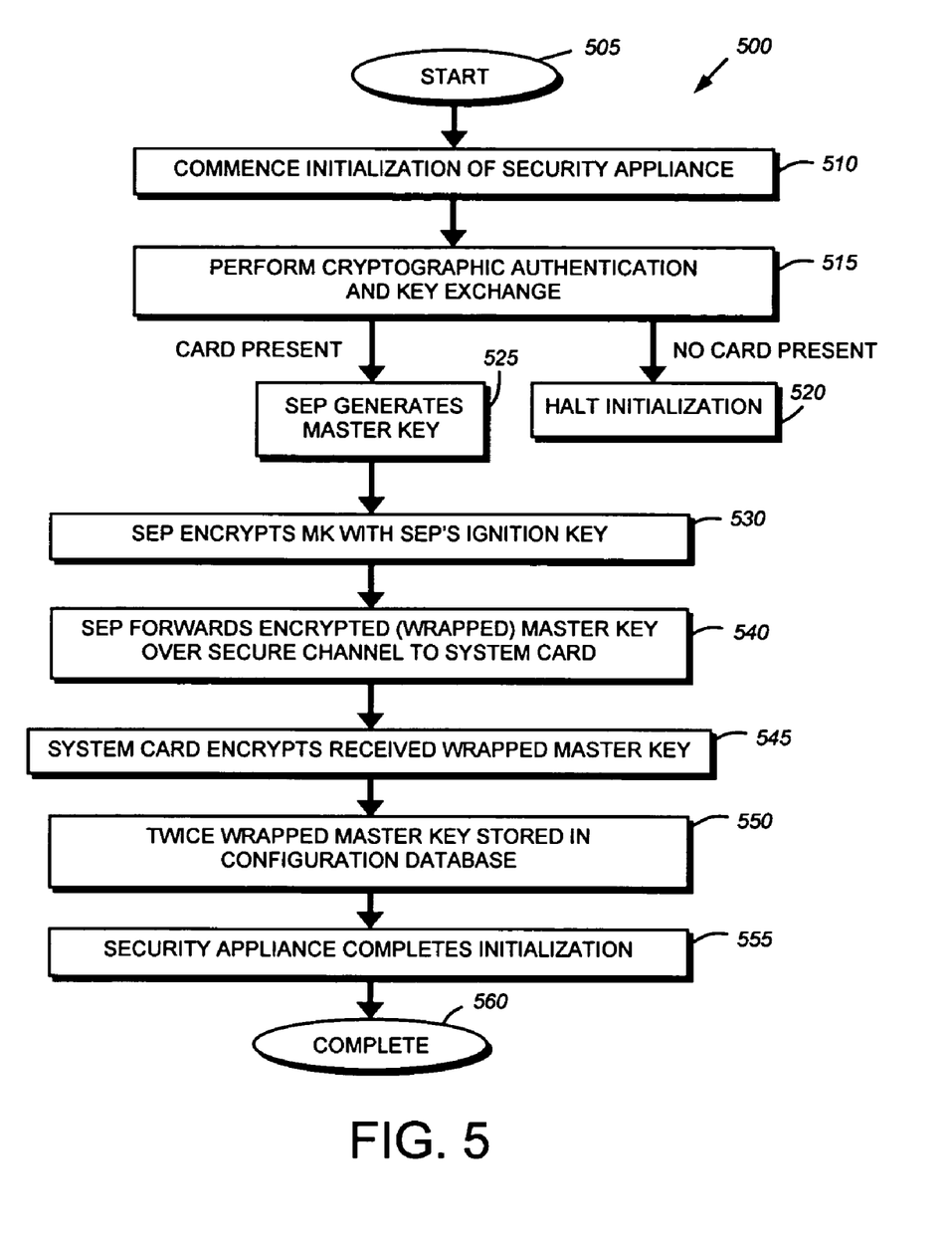
FIG. 5 is a flow chart illustrating the steps of a procedure for secure initialization of security appliance in accordance with an embodiment of the present invention.
Figure 6:
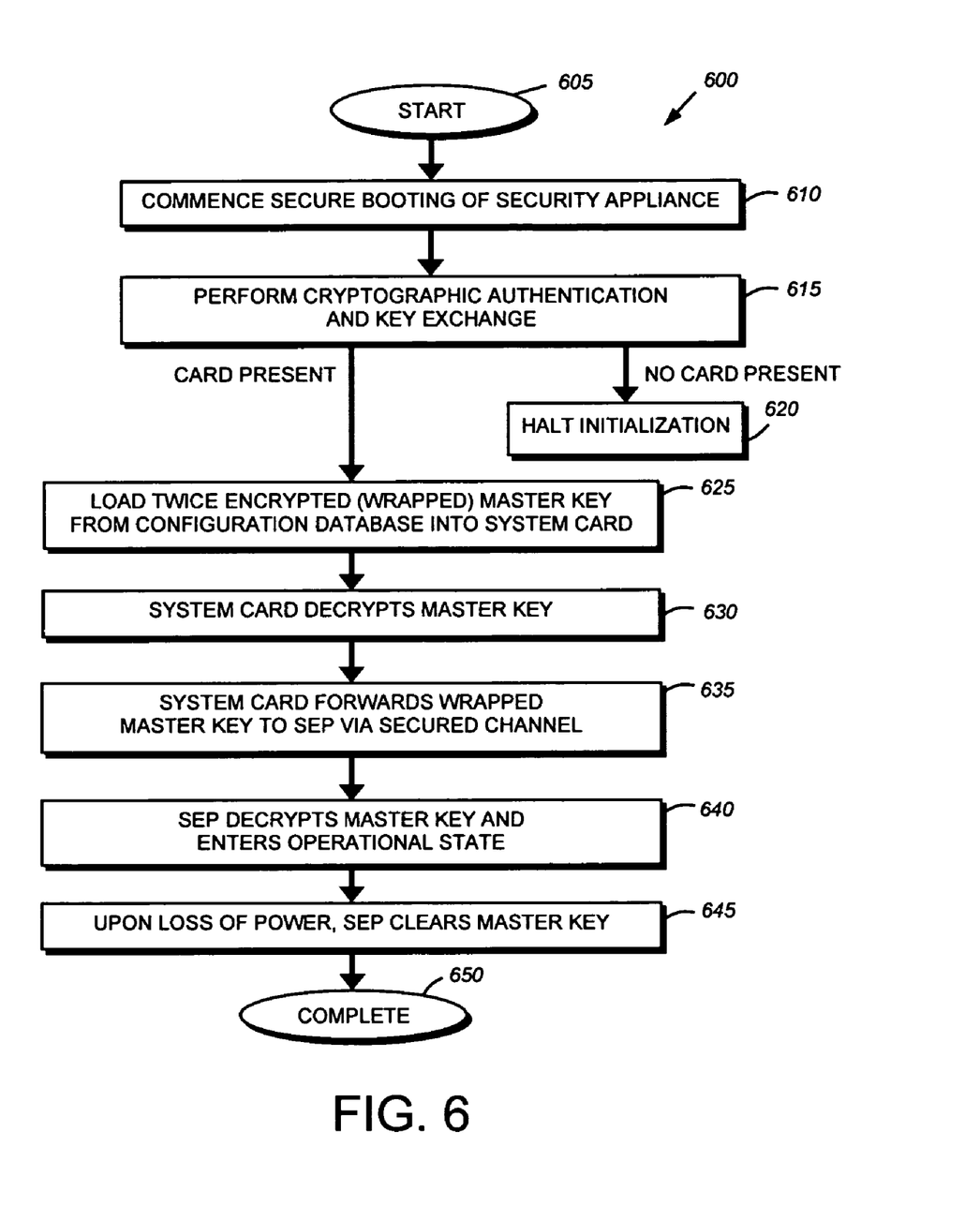
FIG. 6 is a flow chart detailing the steps of a procedure for secure booting of a security appliance in accordance with an embodiment of the present invention.

FIG. 5 is a flow chart detailing the steps of a procedure 500 for secure initialization of a security appliance in accordance with an embodiment of the present invention. Illustratively, the secure initialization procedure is utilized when first installing a security appliance. Thereafter, a secure booting procedure 600, see further below, is utilized upon each "power on" on the security appliance. The procedure 500 begins in step 505 and continues to step 510 where the initialization of a security appliance commences. Illustratively, initialization may occur when, e.g., power is first applied to the security appliance to initiate an initialization (boot up) procedure. In step 515, the security appliance determines whether an appropriate system card is present, e.g., has been inserted into the card reader of the security appliance and performs a cryptographic authentication and key exchange between the SEP and the inserted system card. Illustratively, the SEP and the system card utilize their AKS to form a secure communication channel between them. Should the system card not be inserted, then the procedure 500 branches to step 520 and the initialization procedure is halted until such time as the system card is inserted. By ensuring that a security appliance will not initialize without the system card present, the initialization procedure ensures that physical compromising of the security appliance will not enable access by an attacker to cryptographic (key) material needed to decrypt cryptainers previously created by the security appliance.

However, the cryptographic authentication and key exchange succeeds in creating a secure communication channel, the procedure continues to step 525 where the SEP generates a master key MK for use within the security appliance. Illustratively, the master key may be generated by providing the output of a random number generator to a hashing function to generate an appropriately sized key. However, it should be noted that other techniques may be utilized in generating the master key. In step 530, the SEP encrypts the master key with a SEP's ignition key IG1 to generate $(MK)_{IG1}$. The SEP forwards the encrypted (wrapped) master key over the secure channel to the system card in step 540. In step 545, the system card wraps the master key using the system card's ignition key IG2 to generate $((MK)_{IG1})_{IG2}$. The twice wrapped master key is then stored in the configuration database of the security appliance in step 550. The security appliance may then complete its initialization procedure in step 555 and the procedure 500 completes in step 560. As the security appliance requires both the SEP and the system card to initialize and generate the key material needed for proper operation of the security appliance, the threat of physical misappropriation of the appliance is reduced as an attacker needs to obtain physical possession of both the security appliance and the system card. In the illustrative embodiment, the system card may be removed and securely stored in a remote location from the security appliance once initialization has occurred.

FIG. 6 is a flow chart detailing the steps of a procedure 600 for securely booting a security appliance in accordance with an embodiment of the present invention. The procedure 600 begins in step 605 and continues to step 610 where the secure booting of a security appliance is commenced. The secure booting may occur due to, e.g., a power cycle to the security appliance, an administrator entered command, etc. The system card and the SEP then perform a cryptographic authentication and key exchange in step 615 by, e.g., establishing a secure communication channel between them. Should the system card not be present, the booting procedure is halted in step 620 until such time as the system card is inserted.

If the system card is present and the secure communication channel is created, the procedure continues to step 625 where the system card loads the twice encrypted (wrapped) master key $((MK)_{IG1})_{IG2}$ from the configuration database. Once loaded, the system card then decrypts the outer wrapping of the master key $((MK)_{IG1})_{IG2}$ to retrieve the singly wrapped master key $(MK)_{IG1}$. The system card then forwards the singly wrapped master key to the SEP using the secure communications channel. When the SEP receives the wrapped master key, it unwraps the master key (i.e. decrypts the key and verifies the signature) to reveal the master key, thereby enabling the SEP to enter into an operation state, i.e., a state where the SEP is capable to performing cryptographic operations on cryptainers using the master key and/or other keys within the key hierarchy 400. At some later point in time, upon the loss of power to the security appliance, an administrator entered command, detection of intrusion via an intrusion switch, or other mechanism, the SEP clears the master key in step 645 before the procedure completes in step 650. Thus, should a power cycle operation or other disruption occur, the entire sew cure booting procedure 600 will need to be performed.

The present invention provides several noted advantages over the prior art. By requiring the physical presence of the system card inserted into the security appliance, a mechanism for physical security is provided in that an administrator may remove the system card after the security appliance has initialized. In response, physical theft of the security appliance results in an appliance that will not initialize without the presence of the system card. As a potential attacker would need to physically acquire both the security appliance and the system card, the possibility of physical security attacks is reduced. Acquisition of the system card without the accompanying security appliance does not present a security threat as the system card by itself does not include sufficient information to lead to the compromise of key information associated with the security appliance, because the system card only accesses the singly wrapped master key. Furthermore, to provide for security during shipment, the system card may be shipped separately from the security appliance using, e.g., differing shipment methods to thereby reduce the chance of interception by an adverse party.

The foregoing description has been directed to specific embodiments of this invention. It will be apparent, however, that other variations and modifications may be made to the described embodiments, with the attainment of some or all of their advantages. For instance, it is expressly contemplated that the procedures, processes, layers and/or modules described herein may be implemented in hardware, software, embodied as a computer-readable medium having executable program instructions, firmware, or a combination thereof. Furthermore, while the present invention has been written in terms of security appliances, the principles of the present invention may be utilized in any computer system. As such, the description of a security appliance should be taken as exemplary only. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for securely booting a computer, the method comprising:
    performing a cryptographic authentication procedure to establish a secure communication channel between a smart card and an encryption processor;
    loading a twice wrapped master key, wherein the twice wrapped master key has been first encrypted with a key associated with the encryption processor, and then encrypted a second time with a key associated with the smart card wherein the associated keys from both the encryption processor and the smart card are required to decrypt the twice wrapped master key;
    decrypting, by the smart card, the twice wrapped master key using the key associated with the smart card, the decrypting by the smart card revealing a single wrapped master key;
    transmitting the single wrapped master key to the encryption processor via the secure communication channel; and
    decrypting, by the encryption processor, the single wrapped master key using the key associated with the encryption processor wherein the key associated with the smart card and the key associated with the encryption processor are required to decrypt the twice wrapped master key, and wherein the decrypted master key is required to boot the computer.

2. The method of claim 1 wherein the computer comprises a security appliance.

3. The method of claim 1 wherein the twice wrapped master key, that has been encrypted by the key associated with the smart card and with the key associated with the encryption processor, is stored in a configuration database associated with the computer.

4. The method of claim 1 wherein the encryption processor utilizes the decrypted master key to access a plurality of keys organized in a key hierarchy.

5. The method of claim 1 further comprising, in response to a loss of power, clearing the decrypted master key from the encryption processor.

6. The method of claim 1 further comprising halting the booting of the computer in response to an absence of the smart card.

7. The method of claim 1 wherein decrypting utilizes an Advance Encryption Standard algorithm.

8. The method of claim 1 further comprising the encryption processor entering into an operational state upon decrypting the master key.

9. A system configured to securely boot a computer, the system comprising:
    a smart card reader operatively interconnected with the computer, wherein the computer is configured to commence a booting procedure for the computer when a smart card is inserted into the reader;
    wherein the smart card is configured to establish a secure communication channel with an encryption processor, load a twice wrapped master key, wherein the twice wrapped master key has been first encrypted with a key associated with the encryption processor, and then encrypted a second time with a key associated with the smart card, wherein the associated keys from both the encryption processor and the smart card are required to decrypt the twice wrapped master key, decrypt the twice wrapped master key using a first decryption key associated with the smart card, the decrypting using the first decryption key revealing a single wrapped master key, and forward the single wrapped master key to the encryption processor; and
    wherein the encryption processor is configured to decrypt the single wrapped master key using a second decryption key associated with the encryption processor,
    wherein the key associated with the smart card and the key associated with the encryption processor are required to decrypt the twice wrapped master key, and wherein the decrypted master key is required to boot the computer.

10. The system of claim 9 wherein the computer comprises a security appliance.

11. The system of claim 9 wherein the encryption processor decrypts using an Advanced Encryption System algorithm.

12. The system of claim 9 wherein the encryption processor is further configured to utilize the decrypted master key to access a plurality of keys organized in a key hierarchy.

13. The system of claim 9 wherein the encryption processor is further configured to, in response to a loss of power, clear the decrypted master key from the encryption processor.

14. The system of claim 9 wherein the encryption processor enters into an operational state upon decrypting the single wrapped master key using the second decryption key associated with the encryption processor.

15. The system of claim 9 wherein the first decryption key associated with the smart card comprises an ignition key associated with the smart card.

16. The system of claim 9 wherein the second decryption key comprises an ignition key associated with the encryption processor.

17. The system of claim 9 wherein the twice wrapped master key is loaded from a configuration database associated with the computer.

18. The system of claim 9 wherein the smart card forwards the single wrapped master key to the encryption processor using the secure communication channel.

19. A non-transitory computer readable medium for containing executable program instructions executed by a processor, comprising:
    program instructions that perform a cryptographic authentication procedure to establish a secure communication channel between a smart card and an encryption processor;
    program instructions that load a twice wrapped master key, the twice wrapped master key having been first encrypted with a key associated with the encryption processor and then encrypted a second time with a key associated with the smart card wherein the associated keys from both the encryption processor and the smart card are required to decrypt the twice wrapped master key;
    program instructions that decrypt, by the smart card, the twice wrapped master key using the key associated with the smart card, the decrypting by the smart card revealing a single wrapped master key;

program instructions that transmit the single wrapped master key to the encryption processor via the secure communication channel; and program instructions that decrypt, by the encryption processor, the single wrapped master key using the key associated with the encryption processor wherein the key associated with the smart card and the key associated with the encryption processor are required to decrypt the twice wrapped master key, and wherein the decrypted master key is required to boot the computer.

20. The computer readable medium of claim 19 further comprising, in response to a loss of power, clearing the decrypted master key from the encryption processor.

21. The computer readable medium of claim 19 further comprising halting booting of the computer in response to an absence of the smart card.

22. The computer readable medium of claim 19 wherein decrypting utilizes an Advance Encryption Standard algorithm.

* * * * *

UNITED STATES PATENT AND TRADEMARK OFFICE
CERTIFICATE OF CORRECTION

| | | |
|---|---|---|
| PATENT NO. | : 8,116,455 B1 | |
| APPLICATION NO. | : 11/540300 | |
| DATED | : February 14, 2012 | |
| INVENTOR(S) | : Robert J. Sussland | |

It is certified that error appears in the above-identified patent and that said Letters Patent is hereby corrected as shown below:

Col. 6, line 19: "ment 300 of the software ~~is~~ processes and modules executing on"

Col. 6, line 34: "370) that stores permissions, access control lists (ACL~~S~~s),"

Col. 10, line 42: "occur, the entire ~~sew cure~~secure booting procedure 600 will need to"

Signed and Sealed this
Eighth Day of May, 2012

David J. Kappos
*Director of the United States Patent and Trademark Office*